(12) United States Patent
Strothmann et al.

(10) Patent No.: US 9,236,817 B2
(45) Date of Patent: Jan. 12, 2016

(54) DEVICE FOR DETECTING COLLISIONS AND A METHOD RELATED THERETO

(71) Applicant: Kesseböhmer Produktions GmbH & Co. KG, Weilheim/Teck (DE)

(72) Inventors: Thomas Strothmann, Brahmsche (DE); Oliver Spahn, Mühltal (DE)

(73) Assignee: KESSEBOHMER PRODUKTIONS GMBH & CO. KG (DE)

( * ) Notice: Subject to any disclaimer, the term of this patent is extended or adjusted under 35 U.S.C. 154(b) by 208 days.

(21) Appl. No.: 13/653,429

(22) Filed: Oct. 17, 2012

(65) Prior Publication Data

US 2013/0293173 A1    Nov. 7, 2013

(30) Foreign Application Priority Data

Oct. 18, 2011    (EP) ..................................... 11185649

(51) Int. Cl.
   H01L 41/00    (2013.01)
   H02P 3/06     (2006.01)
   A47B 9/20     (2006.01)
   A47B 9/04     (2006.01)
(52) U.S. Cl.
   CPC ... *H02P 3/06* (2013.01); *A47B 9/20* (2013.01); *A47B 9/04* (2013.01); *A47B 2200/0052* (2013.01); *A47B 2200/0056* (2013.01); *A47B 2200/0061* (2013.01)
(58) Field of Classification Search
   USPC ........ 318/466, 280, 430, 469, 453; 49/26, 28; 310/316, 318
   See application file for complete search history.

(56) References Cited

U.S. PATENT DOCUMENTS

| 4,314,227 | A  | * | 2/1982  | Eventoff ........................ 338/99 |
| 6,500,733 | B1 | * | 12/2002 | Stanbery ....................... 438/459 |
| 6,909,354 | B2 | * | 6/2005  | Baker et al. .................... 338/47 |
| 6,977,476 | B2 | * | 12/2005 | Koch ............................ 318/280 |
| 7,148,882 | B2 | * | 12/2006 | Kamrath et al. ............... 345/174 |
| 7,661,292 | B2 | * | 2/2010  | Buitmann et al. ............ 73/12.01 |
| 8,063,886 | B2 | * | 11/2011 | Serban et al. ................. 345/173 |
| 8,736,276 | B2 | * | 5/2014  | Stonehouse et al. .......... 324/537 |
| 2005/0082997 | A1 |   | 4/2005  | Koch |
| 2008/0289544 | A1 |   | 11/2008 | Buitmann et al. |
| 2009/0134966 | A1 | * | 5/2009  | Baker ............................ 338/99 |
| 2012/0247228 | A1 | * | 10/2012 | Lukas et al. ............. 73/862.381 |

FOREIGN PATENT DOCUMENTS

| AT |       410 626 B  | 6/2003 |
| DE | 102007030473 A1 | 8/2009 |

(Continued)

*Primary Examiner* — Rita Leykin
(74) *Attorney, Agent, or Firm* — Dickinson Wright PLLC

(57) ABSTRACT

In summary it is described a column for a piece of furniture as well as a piece of furniture with at least one movable member (1, 2, 31), wherein said part is adapted to be moved relative to the rest of the furniture in a non-manual way. Further, there is provided a device for detecting collisions of the automatically movable member with obstacles, an automatic drive mechanism (5, 6) which is adapted to move the movable member, a control device adapted to control the automatic drive mechanism (5, 6), and at least one sensor (4) adapted to detect a collision during the motion of the movable member (1, 2, 31) with an obstacle and to transmit this incident to the control device wherein the at least one sensor (4) comprises a force-sensitive sensor (41).

19 Claims, 6 Drawing Sheets

(56) References Cited

FOREIGN PATENT DOCUMENTS

| | | |
|---|---|---|
| DE | 202010015738 U1 | 5/2011 |
| EP | 1 460 914 B1 | 2/2008 |
| EP | 1 891 872 A1 | 2/2008 |
| SE | 516 479 | 1/2002 |
| WO | 03/056976 A1 | 7/2003 |
| WO | WO 2009/146708 A1 | 12/2009 |
| WO | 2011/083019 A1 | 7/2011 |

* cited by examiner

DEVICE FOR DETECTING COLLISIONS AND A METHOD RELATED THERETO

CROSS-REFERENCE TO RELATED APPLICATIONS

This application claims priority to and wholly incorporates by reference European Patent Application Number EP11185649.8, filed on Oct. 18, 2011.

FIELD OF THE INVENTION

The present invention relates to a device and a method for detecting a collision of furniture and, in particular, it relates to a device and a method for detecting collisions of automatically movable members of furniture with obstacles.

BACKGROUND

Furniture with automatically movable members such as desks with an automatically height-adjustable table-top or cupboards with automatically movable doors are known. Here, "automatically movable" refers to a state where a possible movement of parts of furniture is not driven manually, but for example through a spring mechanism, a hydraulic or pneumatic mechanism or a motor-driven gear. Such a desk, as shown in FIG. 1, comprises a table-top 1, a supporting structure 2 and two table-legs 3. The table-legs are built in such a way that they can be moved telescopically and thereby are variable in length, and are connected to the supporting structure. The table-legs include, for example, an electric motor and a threaded rod for the automatic length-variation. By means of a control device which is not shown the electric motors are driven when an operator presses a switch (not shown), the threaded rod rotates, and the table-legs will be telescopically increased or decreased in length, depending on the rotation direction of the threaded rod.

The control device stops the electric motors when the operator either releases the switch, presses the same switch again or presses a further switch or also when a maximum or minimum position of the table-legs is reached. Since such a table-top is constructed to carry relatively heavy loads, such as several monitors or numerous books/files, the mechanic and the electric motors are built accordingly. This results in relatively high forces applied when the table-top is automatically height-adjusted. Further, other mechanisms may be used for the motion drive, such as a differently achieved electrically driven transmission or a hydraulic or pneumatic mechanism. Other devices, such as projectors, which can automatically be hidden in the table, monitors or the like may also act as movable members of furniture.

There are also other known furniture with automatically adjustable components, such as cupboards with movable doors as well as beds or bed-components, in particular, partly adjustable slatted frames.

Now using the example of a height-adjustable table-top: while adjusting, damage to the table or other objects, or even injuries of individuals who are above or below the table-top when it comes to a collision with the table-top and the object during height-adjustment may be caused. In order to avoid such risks, devices are applied for detecting collisions which record a collision of the table-top with an obstacle by use of one or more sensors and transmit information regarding this incident to the control device which then stops the operation of the electric motors.

EP 1 460 914 B1 discloses a device with adjustable elements, wherein there is provided a piezo-electric sensor, which in case of a detected collision, initiates a control signal which stops or reverses the movement.

Piezo-elements, however, are not ideal for the use in such objects. On the one hand, it is necessary to provide quite complex electronics, in order to enhance and then select the generated signals. On the other hand, the piezo-sensors disclosed in EP 1 460 914 B1 are not suitable for measuring a collision when initiating a movement, since an absolute measurement of the load can not be carried out. Due to the physical properties of the piezo-element, a charge displacement during the deformation is somewhat likely. This charge displacement causes a signal. Once the deformation is stopped, the signal also will be broken off. Due to the electronics connected, and the physical properties, electric charges still run off in this static state. This can result in incorrect measurements when measuring again, which can impair the reliability of the collision protection. At least, with this method, it is not possible to record permanent static loads.

SUMMARY

Therefore, the object of the invention is to provide a piece of furniture with a collision protection, which avoids at least one disadvantage known from the prior art and enable a reliable collision measurement.

This object is achieved by a furniture column, by a piece of furniture by a sensor, and by a method, according to the various embodiments of the present invention. Advantageous developments are subject of the dependent claims.

It is important to note for the following declarations that they always refer to a furniture column, even if it is spoken of "furniture". A furniture column, as it lies in the scope of protection, also includes structures that are provided, for example, on cupboards and/or on the hinges thereof, in order to enable an automatic adjustment of these components. The same applies, for example, for chairs and components of beds or bed frames.

A piece of furniture can at least have an automatically movable or motor-driven part which is adapted to be moved relative (in a non-manual way) to the rest of the piece of furniture. Such a piece of furniture has a device for detecting collisions with obstacles and an automatic drive mechanism which moves the movable member as well as a control device which controls the automatic drive mechanism. Further, there is included at least one sensor which records a collision of the movable member with an obstacle during the motion and transmits this incident to the control device. According to the invention, the sensor is a force-sensitive sensor, in particular, it is a pressure-sensitive sensor (for example a so-called "force sensing resistor", or FSR® by Interlink Electronics, Inc.), on which a compressive force is directly applied. While a force-sensitive sensor is usually formed as a resistance, it is also possible that said sensor records the change of a capacity, inductance, magnetic properties or other physical values.

A FSR as used in this invention features a multi-layered, in particular, a double-layered structure. These layers are polymer films that change the electrical resistance of the FSR, depending on their mutual contact surface. In general, a larger contact surface, which usually results from a greater pressure applied on the FSR, entails a lower resistance of the FSR. In the FSR, a first layer has conducting paths that can be connected to several electrodes. Said conducting paths are spaced apart from each other and arranged in such a way that they engaged in a comb-like fashion. A second layer of the FSR has a matrix of conductive and non-conductive components (a semi-conductive paste). The second conductive layer is isolated in an unloaded state of the FSR by being for example spaced apart from the first layer. By pressing together the FSR, the gap between the layers is reduced or the mutual contact of the layers is increased. Depending on the applied pressure or the applied force, the semi-conductive paste of the second layer is pressed between the conductive paths of the first layer, which results in a conductive connection between the conducting paths. Thereby, the resistance of the FSR is reduced. This way, for example, in the FSR, a resistance of 10-100 kΩ can be achieved. The conductivity of the force-sensitive sensor is proportional to the compressive force, which is applied on the force-sensitive sensor. It is also possible to provide only a single conducting path on the first layer. In this case, however, the conductive paste is connected to an electrode. Depending on the desired use of the FSR, there can be provided more than two conducting paths. The resistance to be recorded is measured by the electronics connected.

By use of said FSR, it is possible to detect a collision of the movable member with an obstacle during the motion, as well as a load on the furniture through the acceleration during the motion or a constant load on the furniture, caused by objects placed on the furniture.

This is possible due to the special structure of an FSR comprising two layers as described above, wherein one of the layers has a conductive coating that experiences a change in conductivity when, for example, it is connected to the second, slightly spaced apart layer through a compressive force. The conductivity or resistance correlates with the pressure applied on the FSR and therefore also with the force acting thereon.

The FSR can especially be arranged axially above the driving motor in order to be directly influenced by the force. Further, the distance between the FSR and the motor can be kept as small as possible, which can entail further structural advantages.

Further, an operation member can be provided on the furniture on a side facing the FSR and within its sphere of operation, wherein the operation member is influenced by the FSR in case of a collision which causes a change in conductivity of the FSR, as described above.

Said operation member can, for example, consist of foamed material, in particular, a material, which can be injection-moulded. Alternatively or additionally, the operation member can have an elastomer. Said elastomer can also be injection-moulded. The operation member can either be in contact with the whole FSR or only with parts thereof.

In particular, it is possible that the operation member has an operation protrusion which, for example, protrudes conically out of the operation member, showing a predefined contact area for various forces acting on the FSR. It is also possible that the operation protrusion shows a step-shaped profile. Depending on the pressure applied on the FSR, there can be achieved different conductivities which can simplify the reading of the load, and the identification of collisions or overloads. However, other configurations are also possible.

It is important to note that there is provided at least one sensor, but there might also be a plurality of sensors. At least one of the sensors provided in the furniture can be arranged in such a way that a compressive force is applied on the FSR in case of a collision. It is also possible to arrange the sensor in such a way that there is applied a tensile force on the FSR in case of a collision of the movable member.

The first case example, described above, may involve a case in which a table-top collides with an obstacle, such as an open window or a cupboard when the table is lifted. In this case, a further lifting of the column against the resistance of the collided plate would exert a compressive force on the FSR, which, from a predefined threshold value, causes a signal which is sent to the control device.

It is also possible that the table-top collides with obstacles located under the table, when the table is lowered and therefore the movable member of the furniture is stopped in its movement. As a result, a tensile force is caused due to the relative motion between the several components of the movable member, such as a table-top and a motion element that is connected to the motor. If the FSR is coupled to both components, there will also be applied a tensile force on the FSR, and a signal is initiated.

Further, for a more accurate detection, at least one of the sensors or only one sensor can be impinged with a compressive force in a state in which the furniture is not colliding, resulting in a specific conductivity of the FSR which can be detected by the device for detecting collisions as an initial value. In this way, an increase of the force or also a decrease of the force can lead to a signal initiation.

A method for controlling the automatic motion of a movable member in a furniture comprises the steps of: measuring a resistance of the force-sensitive sensor or the signal of the sensor, detecting a force, in particular, a compressive force on the FSR in said sensor in the case of a collision of a furniture with an obstacle, and/or detecting a load of the furniture, either in the case of a collision or in a static-motionless-state, transmitting a collision-signal or an overload-signal to the control member, and stopping a motion in the case of an automatically controlled motion of the movable member by the control member, and/or initiating of a warning-signal in the case of an overload of the furniture, even in the static state. Moreover, it is possible in further developments that a motion is not triggered in case of an overload of the piece of furniture, as, for example, a control signal for adjusting the movable member is not outputted at all. In this way, a damage of the motor caused by an overload can be avoided.

A sensor for the use in furniture comprises a FSR as described. Said sensor can be provided in the furniture as a collision-sensor and/or as a relative sensor for example during the motion or as an absolute weight-sensor for example in the static state. In this way, a reduction of the risk of an overload of the motor, especially during lifting, can be achieved.

BRIEF DESCRIPTION OF THE DRAWINGS

Details, further advantages and developments of the invention will be described in more detail with the embodiments, referring to the illustrations. Therein shows.

DETAILED DESCRIPTION

Figure 1:
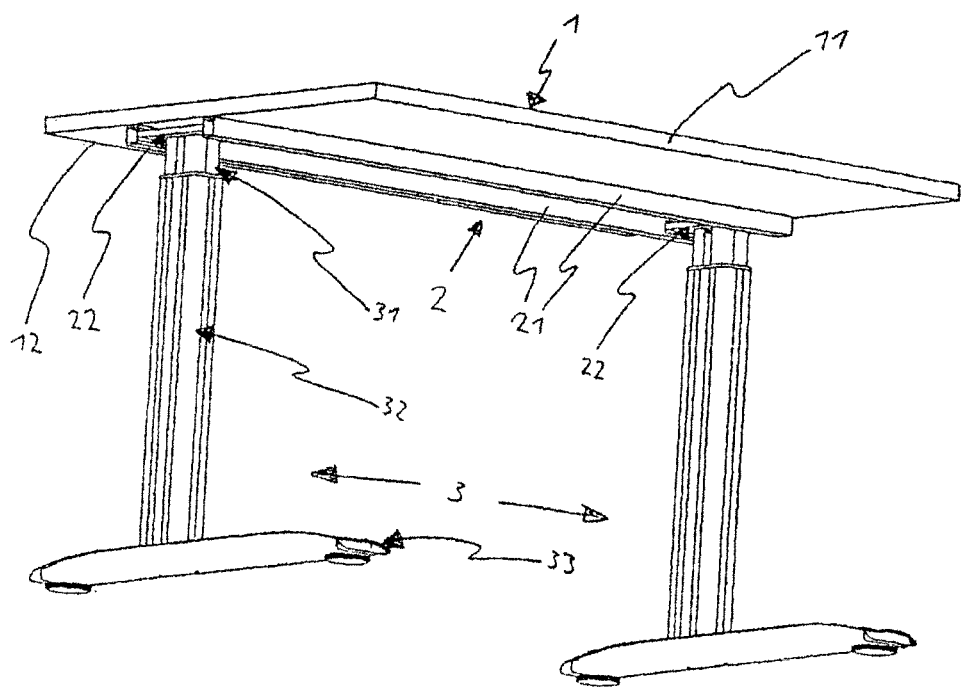
FIG. 1 oblique view of an automatically height-adjustable table as known from prior art.

FIG. 1 shows as an example for a piece of furniture, an automatically height-adjustable table with a table-top 1, having a front edge 11 and a back edge 12. The table-top 1 is mounted on a supporting structure 2 that comprises a front and a rear square beam 21 as well as a right and a left carrier-plate 22. The carrier-plates 22 are each connected to the table-legs 3. A table-leg comprises an inner table-leg-member 31 which is at its upper end connected to the carrier-plate 22, and an outer table-leg-member 32, wherein the table-leg-members 31, 32 are arranged in such a way that the table-leg 3 is telescopically variable in length. On the lower end of the outer member 32, perpendicular to it, there is arranged a base member 33. Within the inner table-leg-member 31, there is mounted a motor, preferably an electric motor 5 and a spindle gear which is not shown with a threaded rod 6 (compare FIG. 4).

The electric motors 5 of both of the table-legs 3 are driven by a control device which is not shown and are adapted to rotate the threaded rod 6, and thereby cause an automatic length-variation of the table-legs 3. This will be described in more detail below. A control device is connected to a switch for selecting an upward movement and to a switch for selecting a downward movement of the table-top 1.

Figure 2:
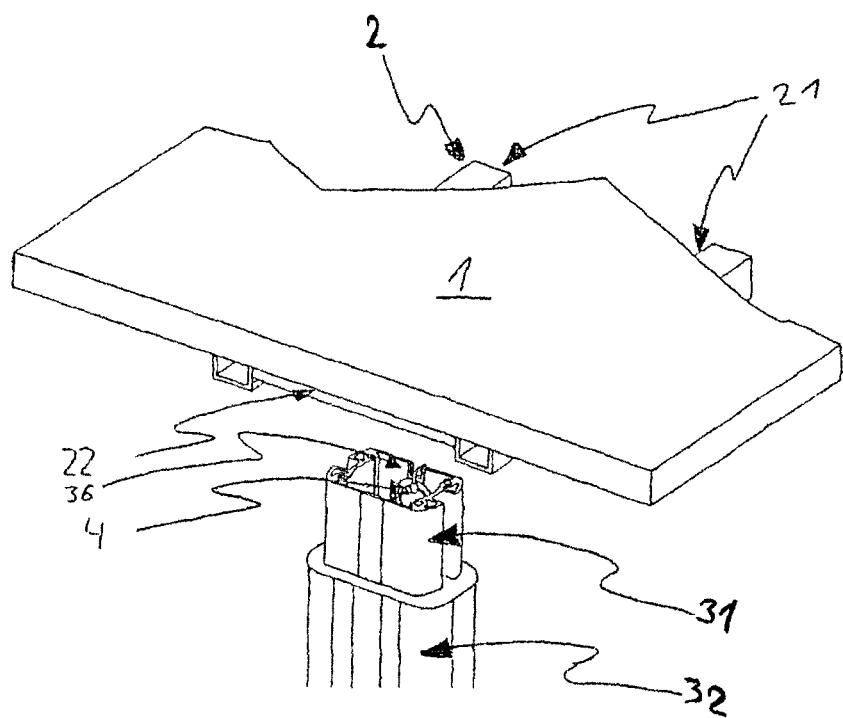
FIG. 2 a section of a position for mounting the sensor within a table-leg according to one embodiment of the invention.

As shown in FIG. 2, in this embodiment, the sensor is located at an upper end of the hollow inner table-leg-member 31 in a position which is spaced apart from the side of the inner table-leg-member facing the table-top 1. The sensor 4 spaced apart from the inner table-leg-member 31 is shown here in an angular arrangement for a better overview. Preferably, the sensor 4 of this as well as of any further described development is arranged in this way within the inner table-leg-member 31 so that an axis along the direction of extension of the table-leg 3 is perpendicular to the surface of the sensor 4.

Figure 3:
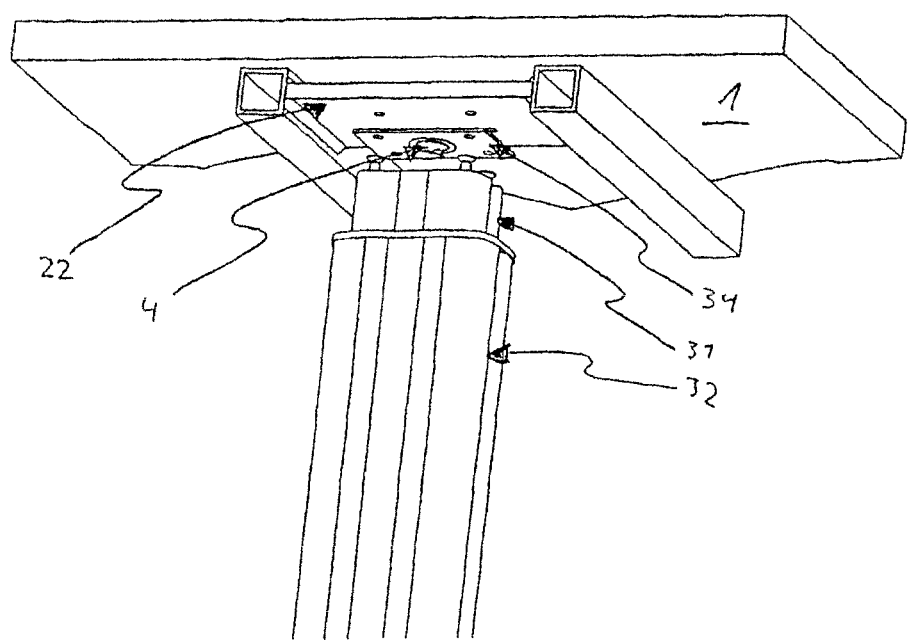
FIG. 3 a section of a position for mounting the sensor outside the table-leg according to a further embodiment of the invention.

In another embodiment, as shown in FIG. 3, the sensor 4 is located as an upper end of the inner table-leg-member 31, inbetween the inner table-leg-member 31 and the table-top 1. Thereby, there is provided an additional plate 34 between the sensor 4 and the table-top 1. The additional plate 34 serves for contacting with the sensor 4 in case of a collision of the movable member, here, a collision of the table-top 1 with an obstacle. The sensor 4 can also be directly mounted on the table-top 1 or on the carrier-plate 22, as long as a collision of the table-top 1 with an obstacle results in a force that is applied on the sensor 4 or in a change in force of the sensor 4.

In particular, it is also possible to arrange a sensor 4 in a way that a collision results in a force that is applied on the sensor 4 when the table plate 1 is lifted, since the threaded spindle pushes the inner table-leg-member 31 and therefore also the sensor 4 in the direction of the colliding table-top 1, until a threshold value of the resistance of the sensor is achieved that causes a stopping of the lifting movement. A further sensor 4 can be arranged in a way that it is arranged with a predefined force between the inner table-leg-member 31 and the table-top 1. In case of a collision with an obstacle which is located below the table plate, when the table plate 1 is moved downwards, the motor or the threaded spindle would pull the inner table-leg-member 31 away from the table-top 1 so that a tensile force is applied on the sensor 4 which counteracts the predefined compressive force and in turn results in a change of resistance of the sensor 4.

Figures 4A, 4B:
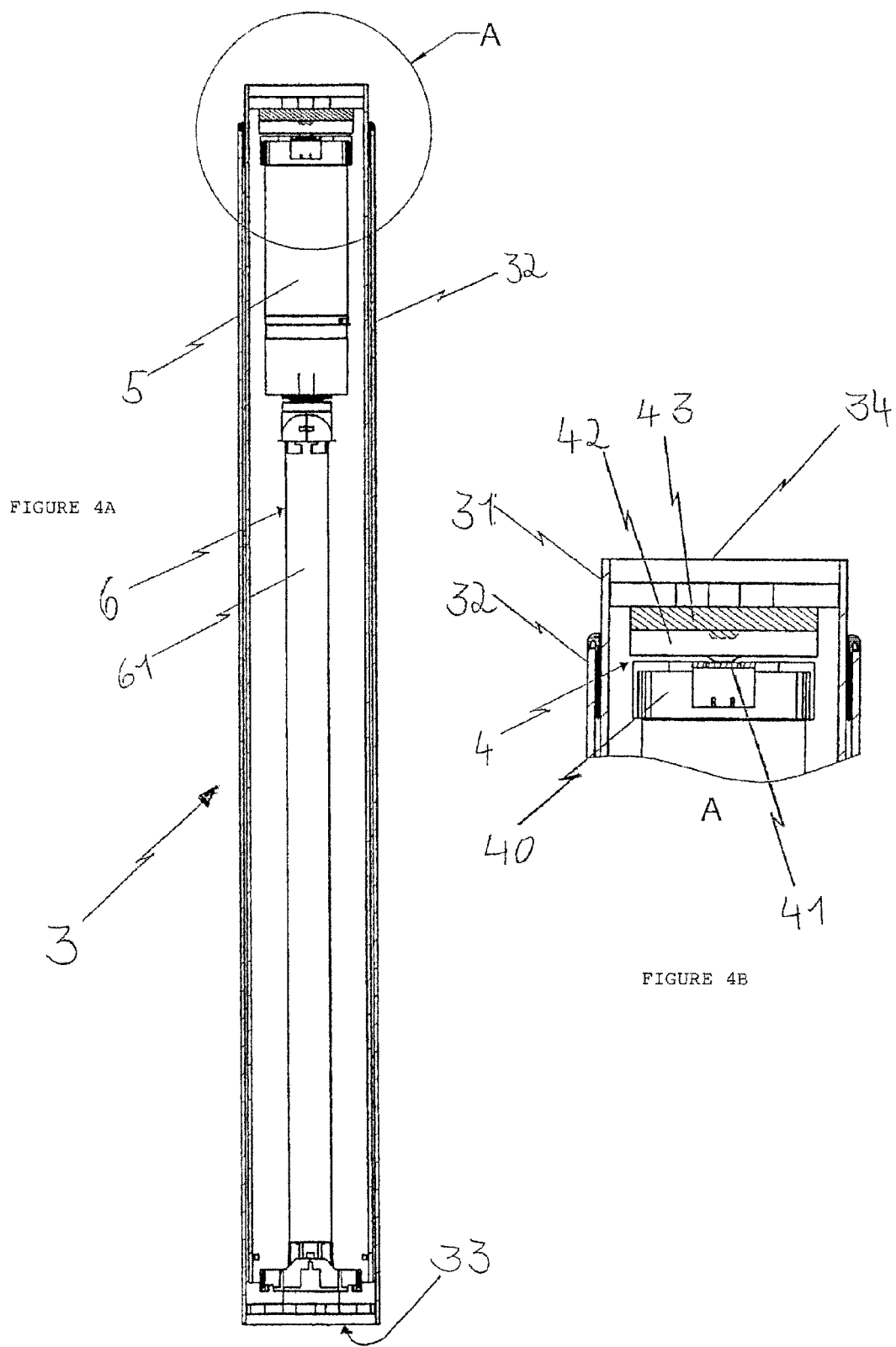
FIG. 4 a moveable column with a sensor according to the invention and to one embodiment of the invention in a) a general view of the column and b) in a detailed view of a part of the column.

FIG. 4a shows a complete table-leg 3 in a retracted state of the inner table-leg-member 31. As especially shown in detail in FIG. 4b), the sensor 4 is arranged in a position within the inner table-leg-member 31 in a direction from the electric motor 5 towards the additional plate 34, actually, above the electric motor 5. The electric motor 5 is also arranged within the inner table-leg 31 and in the area of an upper end of the inner table-leg-member 31. The threaded rod 6 extends in a direction from the electric motor 5 to a base member 33 which is not shown in FIG. 4, establishing a coupling between the motor and therefore between the inner table-leg-member 31 and the outer table-leg-member 32.

The threaded rod 6 comprises a shaft (not shown) which is in FIG. 4 arranged within the member 6, as well as an encasement of the shaft 61. The shaft is connected to the motor, wherein the encasement of the shaft 61 of the threaded rod 6 is connected to the base member 33 and/or till the outer table-leg-member 32, on a side facing the base member 33. The shaft and the encasement of the shaft 61 are interconnected with a thread (not shown). Due to the coupling of the threaded rod 6 or the encasement of the shaft 61 with the table-leg-member 31, 32, a rotation of the shaft causes a displacement of the motor in a vertical, axial direction in a direction towards the base member 33 or in a direction away from the base member 33, depending on the direction of rotation of the shaft. Due to the coupling of the electric motor 5 with the inner table-leg-member 31, the inner table-leg-member 31 undergoes a relative motion towards the outer table-leg-member 32. The table-leg 3 is therefore moved telescopically and it is performed a height-adjustment of the inner table-leg-member 31 relative to the outer table-leg-member 32.

It shall also be appreciated by those having ordinary skill in the art that it is also possible to use another kind of coupling of the inner table-leg-member 31 with the outer table-leg-member 32. It is also possible to use rope pulls or coupling elements to perform an appropriate coupling of the elements which are moveable with respect to each other. It is also possible to arrange the motor in another position, for example, in an area of the base member or to use more than one motor, and/or more than two table-leg-members.

As it is further shown in FIG. 4, the sensor 4 provided in this embodiment comprises a force-sensitive sensor 41 (hereafter referred to FSR, according to the preferably used sensor). The FSR 41 is arranged above the electric motor 5 within a sensor frame 40. The sensor frame 40 is formed in such a way as to be arranged within the inner table-leg-member 31 and above the electric motor 5. The FSR 41 has a measuring section and a coupling section. The measuring section being present is a basically round surface on which the pressure for changing the resistance is to be applied. The coupling section, also called the "tail", is a wired lead for coupling the FSR 41 with the downstream electronics. It is important to note that the shape of the FSR 41 has an influence on its electrical conductivity; there can however be applied FSR with other shapes than described here. There can, in particular, be applied FSR with a rectangular or irregular shape. It is also possible to apply more than one FSR or that a FSR is formed in such a way as to have more than one contact surface with the members exerting pressure on it.

Above the FSR 41, on a side of the FSR 41 averted from the electric motor 5, there is provided an attenuation element 42. The attenuation element 42 preferably comprises a sound- or vibration-absorbing material such as rubber or plastic foam. The attenuation element 42 is arranged within the sphere of operation of the FSR 41, but without being in contact with it. In alternative embodiments, the attenuation element 42 can be in contact with the FSR 41, in particular, having a defined preload.

Above the attenuation element 42, there is arranged an operating member 43. The operating member 43 can especially be a plate consisting of steel and/or plastic. The attenuation element 42 as well as the operating member 43 may have a round shape and can be inserted in the hollow inner table-leg-member 31. The operating member 43 thereby is in contact with the additional plate 34, the carrier-plate 22 or directly with the table-top 1 (not shown).

Figure 5:
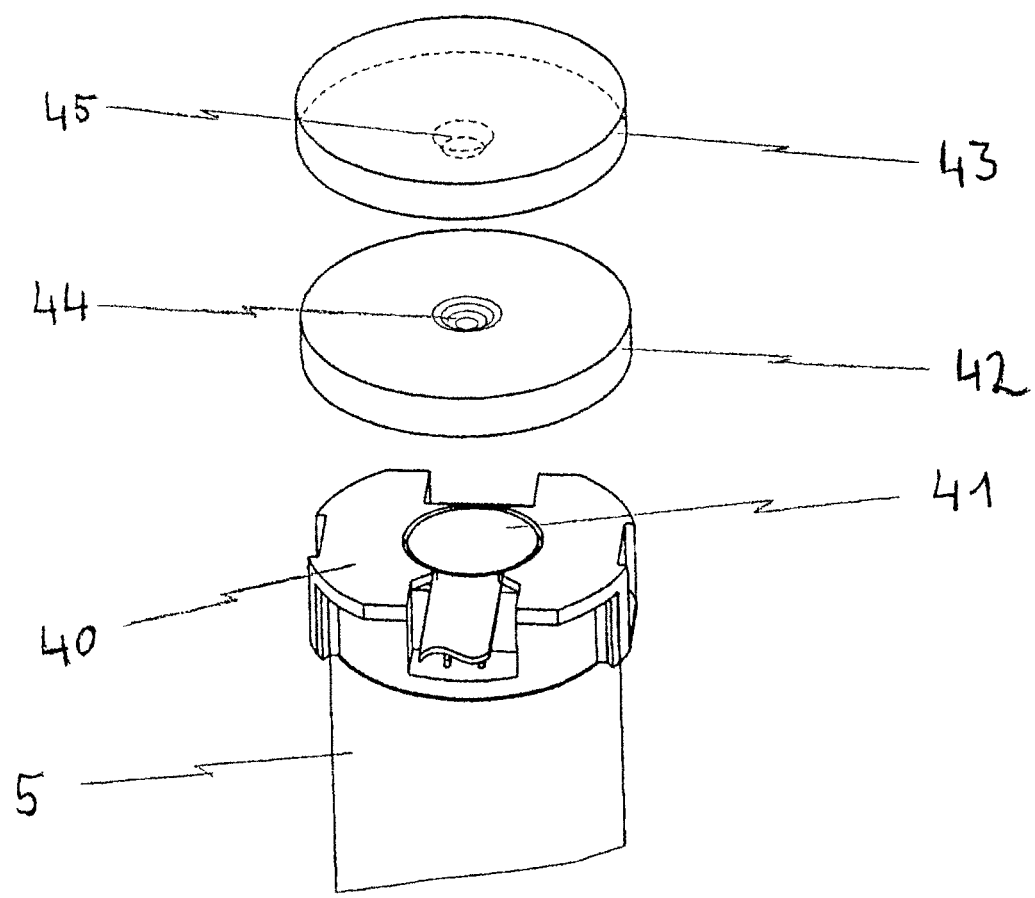
FIG. 5 a perspective exploded view of a sensor according to the invention in a moveable column, seen diagonally from above.

In a preferred embodiment of the invention, the operating member 43 comprises an operating protrusion, here in the form of a nub 45, as shown in FIG. 5. As shown in the embodiment, the nub 45 is arranged around the centre of the operating member 43. In alternative developments, a plurality of operating protrusions can be provided on the operating member. The nub 45 extends from a side of the operating member 43 facing the FSR 41 to the direction of the FSR 41. In the embodiment shown, the nub 45 is formed as a conical protrusion. In further embodiments, the nub can also be step-shaped or have any other shape.

The attenuation element 42 has a protrusion 44 which is correspondingly designed and preferably form-locking with the nub 45, in which the nub 45 can be inserted in an assembled state of the sensor 4. It is also possible that the attenuation element 42 does not have a protrusion, and the nub 45 can be inserted into the attenuation element 42 solely due to its material properties. This is particularly applicable for very soft attenuation elements, and/or very hard operating members. If the operating member is formed with a plurality of nubs, the attenuation element can analogously be formed with a plurality of protrusions.

The FSR 41 of the sensor 4 is arranged in the centre of the sensor frame 40. The attenuation element 42 and the operating member 43 are arranged above the FSR in such a way that the nub 45 applies a compressive force on the FSR 41 at least in case of a collision. This means that the FSR 41, the protrusion 44, and the nub 45 are arranged in an axial direction, one above each other and influencing each other.

Figure 6:
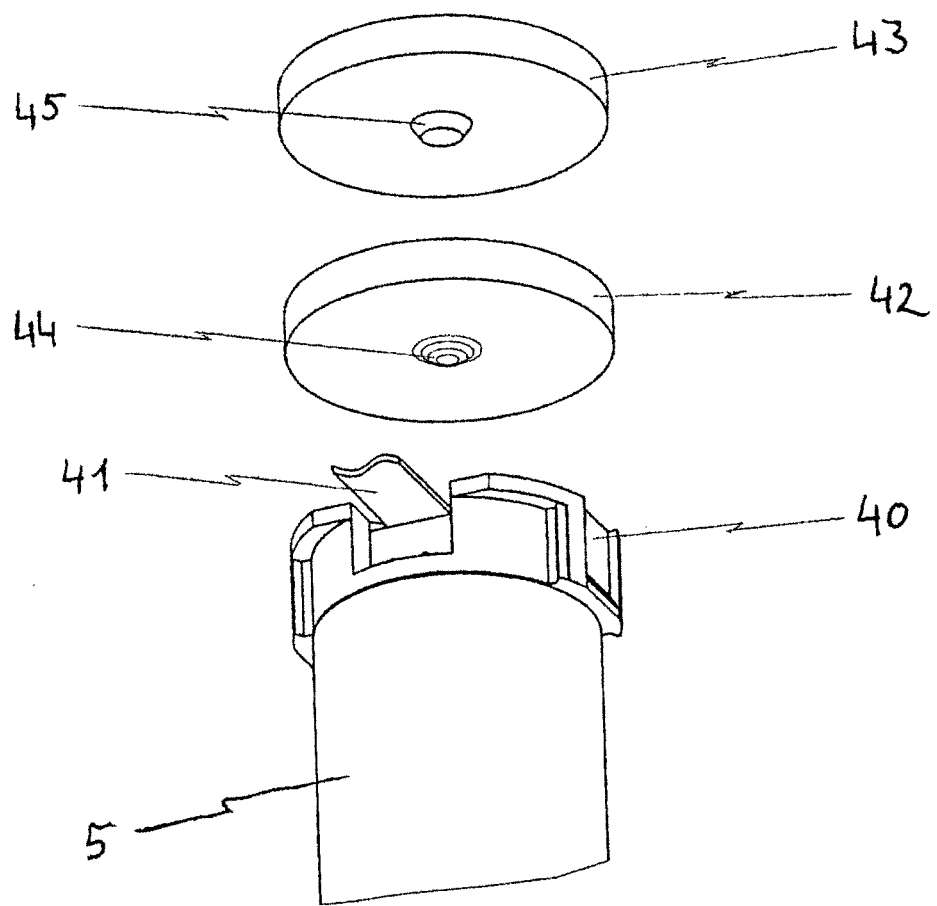
FIG. 6 a perspective exploded view of a sensor according to the invention seen diagonally from below.

FIG. 6 shows the arrangement shown in FIG. 5 seen diagonally from below. It can be seen that the nub 45 protrudes through the protrusion 44 towards the FSR 41. The attenuation element can also be formed with a plurality of openings corresponding to the nubs.

It is also possible that the attenuation element 42 consists of a material absorbing a transmission of vibrations from the moveable member to the stationary member, thereby transmitting a compressive load to the FSR in case of a collision. In this case, an operating member is not necessary.

In summary, a column for a piece of furniture as well as a piece of furniture with at least one movable member 1, 2, 31, are described, wherein said member is adapted to be moved relative to the rest of the furniture in a non-manual way. Further, there is provided a device for detecting collisions of the automatically movable member with obstacles, an automatic drive mechanism 5, 6 which is adapted to move the movable member, a control device adapted to control the automatic drive mechanism 5, 6, and at least one sensor 4 adapted to detect a collision during the motion of the movable member 1, 2, 31 with an obstacle and to transmit this incident to the control device, wherein the at least one sensor 4 comprises a force-sensitive sensor 41.

The invention claimed is:

1. A furniture column with at least one motor-driven member which can be moved relative to the rest of the furniture, comprising:
    a device for detecting collisions of the movable member with obstacles, an automatic drive mechanism adapted to move the movable member, a control device adapted to control the automatic drive mechanism, and at least one sensor adapted to detect a collision during the motion of the movable member with an obstacle and to transmit this incident to the control device, wherein the at least one sensor comprises a force-sensitive sensor, wherein a control-signal can be generated, depending on the conductivity value of the force-sensitive sensor.

2. A furniture column according to claim 1, wherein the force-sensitive sensor comprises at least one conducting layer and a matrix consisting of a conductive and a non-conductive material.

3. A furniture column according to claim 1, wherein the force-sensitive sensor is formed in such a way that the conductivity of the force-sensitive sensor is proportional to a compressive force applied to the force-sensitive sensor.

4. A furniture column according to claim 3, wherein the operating member comprises a plastic foam material and/or an elastomer.

5. A furniture column according to claim 1, wherein the force-sensitive sensor is arranged axially above the motor.

6. A furniture column according to claim 5, wherein the plastic foam material and/or the elastomer can be injection-moulded.

7. A furniture column according to claim 1, wherein there is provided an operating member influencing the force-sensitive sensor.

8. A furniture column according to claim 7, wherein the operating member comprises an operating protrusion.

9. A furniture column according to claim 8, wherein the operating protrusion has a conical shape.

10. A furniture column according to claim 1, wherein the sensor is arranged in such a way that there is applied a compressive force on the force-sensitive sensor, in case of a collision.

11. A furniture column according to claim 1 wherein at least one sensor is arranged in such a way that there is applied a tensile force on the force-sensitive sensor in case of a collision.

12. A furniture column according to claim 1, wherein at least one of the sensors is pre-impinged with a compressive force in a non-colliding state.

13. Sensor for use in a furniture column according to claim 1, wherein the sensor comprises a force-sensitive sensor.

14. A use of a sensor according to claim 13, wherein the sensor is a collision-sensor and/or an absolute weight-sensor provided in the furniture column.

15. Furniture with at least one furniture column according to claim 1.

16. A method for controlling an automatic motion of the movable member in a furniture column according to claim 1, comprising the steps of:
    measuring the resistance of the force-sensitive sensor;
    detecting a compressive force on the force-sensitive sensor within the sensor in the case of a collision of the furniture with an obstacle;
    transmitting a collision-signal to the control-unit;
    stopping the motion of the movable member by means of the control device.

17. A method for controlling the automatic motion of the movable member according to claim 16, comprising the steps of: reversing the direction of movement of the movable member for a certain time and/or a distance after detecting a collision.

18. A height-adjustable table including a table top movably supported on a leg member having motor-driven table top which can be moved relative to the rest of the table, comprising:
    a device for detecting collisions of the table top with obstacles, an automatic drive mechanism adapted to move the table top, a control device adapted to control the automatic drive mechanism, and at least one force-sensitive sensor adapted to detect a collision during the motion of the table top with an obstacle located above or below the table top, and to transmit this incident to the control device;

wherein a control-signal can be generated, depending on the conductivity value of the force-sensitive sensor;

wherein there is applied a tensile force on the at least one force-sensitive sensor in case of a collision with an object located below the table top;

wherein the at least one force-sensitive sensor is pre-impinged with a compressive force in a non-colliding state; and wherein further, in case of a collision with an object located below the table top, the application of the tensile force on the at least one force-sensitive sensor effects a change in the conductivity value of the force-sensitive sensor pre-impinged with the compressive force.

19. A furniture column with at least one motor-driven member which can be moved relative to the rest of the furniture, comprising:

a device for detecting the application upon the movable member of excessive weight and/or collision of the movable member with an obstacle, an automatic drive mechanism adapted to move the movable member, a control device adapted to control the automatic drive mechanism, and at least one force-sensitive sensor adapted to detect (i) an absolute weight applied to the movable member and (ii) a collision with an obstacle during the motion of the movable member;

wherein, depending on the conductivity value of the force-sensitive sensor, the force-sensitive sensor generates and transmits to the control device a control signal, the control signal being either a collision signal signaling collision of the movable member with an obstacle or an overload signal signaling the application of excessive weight upon the movable member.

* * * * *